Figure 1:
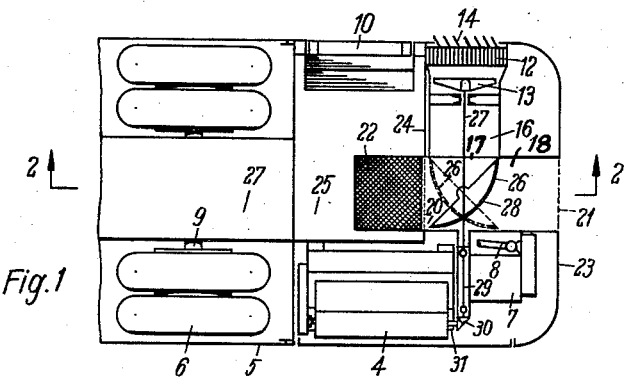

Sept. 7, 1954  K. WILFERT  2,688,447
HEATING SYSTEM FOR MOTOR VEHICLES
Filed July 19, 1950

Inventor
Karl Wilfert
By Michael and Pedlow
Attorneys

Patented Sept. 7, 1954

2,688,447

UNITED STATES PATENT OFFICE 2,688,447

HEATING SYSTEM FOR MOTOR VEHICLES

Karl Wilfert, Sindelfingen, Kreis Boblingen, Germany, assignor to Daimler-Benz Aktiengesellschaft, Stuttgart-Unterturkheim, Germany Application July 19, 1950, Serial No. 174,667

Claims priority, application Germany July 20, 1949

2 Claims. (Cl. 237—12.3)

The invention refers to a fresh air heating device for motor vehicles, in particular omnibuses. The object of the present invention is to provide an improved heating effect by means of an arrangement of the heating device so that large cross-sections of the heating air pipes thereof can be used with a space saving arrangement in the vehicle.

It is a further object of the present invention to make possible a simple and purposeful regulating of the heating effect of the device. A further object of the invention is to provide an arrangement so that air which is substantially free from gasoline and oil vapours, enters the interior of the vehicle as heating air.

A further object of the invention is to provide a favorable counterbalance of weight and a favorable utilization of space of a vehicle, particularly in connection with buses.

In accordance with these objects, it is a characteristic of the invention that with a rear-engine arrangement, the driving engine and cooler or radiator are arranged on different sides of the vehicle, whereby the engine cooler or radiator serves simultaneously for purposes of heating of the interior of the vehicle. On the one hand, an effective counterbalance of weight is achieved thereby, and on the other hand, the fresh air, which is conveyed e. g. by a cooling blower through the liquid cooler or radiator and which is warmed up in the cooler or radiator, is not contaminated by oil or fuel vapours. Furthermore according to the invention, large effective air channels can be used, which can for example be arranged under the seats in the vehicle in a comfortable and space saving manner and with it a simple regulating of the heating effect.

According to a further characteristic of the invention the pressure conduit from the cooling blower behind the liquid cooler or radiator is divided into two channels or conduits, one of which leads to the outside, and the other of which leads to the interior of the vehicle, whereby at the point of juncture of the two channels a change-over or regulating device is arranged, which permits direction of the desired quantity of the warmed up fresh air either into the interior of the vehicle or to the outside.

According to a further characteristic of the invention the driving engine is arranged in a longitudinal direction of the vehicle behind the rear wheels thereof on one side, and the liquid cooler or radiator is located opposite the driving engine on the other side of the vehicle, within the wall of the vehicle behind a lateral entrance door and adjacent the last seat bench of an omnibus.

According to a further characteristic of the invention, the fresh air conduit or the pressure conduit of the cooling blower is formed by the seat box of a seat or of a seat bench arranged transversely to the longitudinal direction of the vehicle, whereby there is obtained a construction for guiding heated air, which is particularly simple, space saving and which still makes feasible conduits of large cross section having relatively large capacity.

Figure 2:
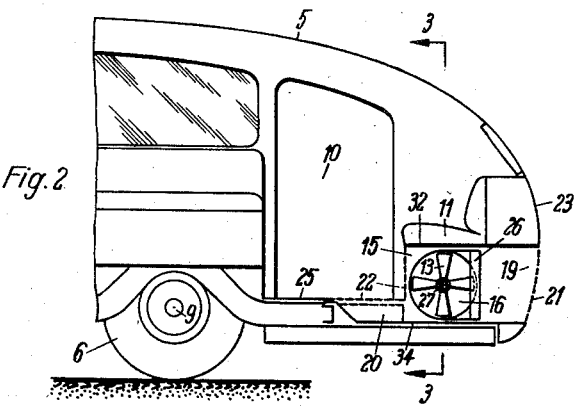
Figure 3:
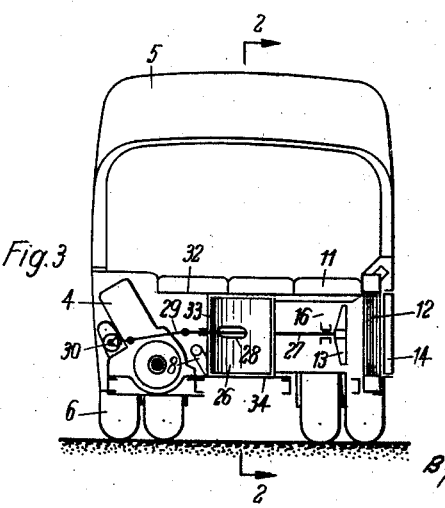

Further objects and advantages of the present invention will become more obvious from the following description when taken in connection with the accompanying drawing which shows for purposes of illustration only one preferred embodiment in accordance with the present invention, and wherein:

Figure 1 shows the rear part of an omnibus car body seen in longitudinal cut from above, Figure 2 shows a vertical cross-section along the line 2—2 of Figure 1; and Figure 3 a cross-section along the line 3—3 of Figure 2.

The driving engine 4 of the vehicle, in the described case a liquid or water cooled combustion engine, is arranged in the rear part of the car body 5 and on the left side of the vehicle in a longitudinal direction of the vehicle but behind the rear wheels 6. Its power is conveyed in the usual and well known manner to the rear axle 9 of the vehicle via a speed change gear 7 and through a Cardan shaft 8. The liquid cooler or radiator 12 of the engine with the cooling air blower 13 is arranged on the right side of the vehicle opposite the driving engine behind a lateral entrance door 10 and adjacent the rear, transverse seat bench 11 of the car body. The term "side" as used herein, means laterally of the longitudinal axis of the vehicle. The supply of cool air can be regulated by flaps 14, which are formed like Venetian blinds. The blower forces the fresh air, which is sucked in from the outside through the cooler and is warmed up while passing therethrough, into a transverse channel 16 arranged in the seat box 15, and discharges into a longitudinal channel 18 at 17 and thus divides itself into a branch 19 leading towards the rear and a branch 20 leading towards the front. Both branches are closed at their ends by screens 21, 22. The screen 21 is located in the back wall of the car body, the screen 22 in the front wall 24 of the seat box 15 and in the floor 25 of the car body.

At the place, at which the pressure channel divides into the two branches 19, 20, a flap 26 is arranged, which can be swung around its vertical axis. In accordance with the changeable position of this flap a smaller or larger part of the warmed fresh air pours either through the screen 21 to the outside or as heating air through the screen 22 into the passenger space of the car body. In the full-line position of the flap 26 the entire quantity of air conveyed by the blower is utilized for purposes of heating of the interior space of the vehicle, while in the position 26, which is shown in interrupted lines, the heating is switched off and the entire quantity of air pours into the open air.

The blower shaft 27 is arranged well within the seat box 15 transverse to the longitudinal direction of the vehicle and passes through a slot 28 of the change-over flap 26. It receives its drive via a Cardan shaft 29 and a pair of bevel gears 30 from the instrument driving shaft 31 of the vehicle driving engine, which drives also the other additional devices of the engine, such as the fuel injection pump, the light dynamo, the water circulating pump, the air compressor and the like and which is arranged on the outside of the engine 4 because of better access to these devices. The described arrangement and construction of the duct system for the heating air offers from a point of view of construction among others the advantage that the seat box of the rear seat bench, which is available anyhow, and its walls 32, 33 together with the bottom 34 of the box can be utilized simultaneously as walls of the air channels, whereby there results an essential economy in material, work and weight.

In order to further improve the counterbalance of the weight distribution, other aggregates, such as, for example, the fuel containers or the like, may be arranged in addition to the cooler or radiator on the side of the vehicle which is opposite to the driving engine.

What I claim is:

1. In a motor vehicle of the omnibus type, a liquid cooled driving engine located at one side of the longitudinal center plane of and in the rear of the vehicle, a cooling radiator operatively connected with said engine for cooling the liquid thereof, said radiator being disposed at the opposite side of said plane in the rear of the vehicle and spatially separated from the driving engine, an opening provided in the side wall of the vehicle adjacent said radiator, a fresh air channel system including three branches located in the space formed between said driving engine and said cooler, one branch of said channel system leading transversely with respect to said longitudinal plane to said opening, the second branch leading forwardly to the passenger room of the vehicle for heating purposes, and the third branch leading rearwardly to the outside of the vehicle, a change-over device for variably connecting said first branch of said channel system either with said second or with said third branch thereof, and an air blower driven by said driving engine of the vehicle and arranged in said first branch intermediate said opening and said change-over device.

2. A heating device for a bus having a passenger seat at the rear thereof and including a liquid cooled driving engine and a cooling radiator therefor, said engine and said radiator being arranged spatially separated from one another on opposite sides of the bus below said passenger seat, means including said cooling radiator and arranged in a side wall of the bus for heating the fresh air entering said radiator, an air blower behind said radiator operated by said driving engine and conducting the heated air into the inside of the bus, a pressure line, multiple channels extending from the blower, one of said channels leading into the open air and the other into the inside of the bus, the walls of said pressure line and of said cooling blower being formed by the walls of said passenger seat, and a change-over flap member at the branching of the multiple channels for selectively conducting any desired partial quantity of the heated fresh air, either into the inside of the bus or into the open air.

References Cited in the file of this patent

UNITED STATES PATENTS

| Number | Name | Date |
|---|---|---|
| 1,979,191 | Burney | Oct. 30, 1934 |
| 2,009,823 | Van Vulpen et al. | July 30, 1935 |
| 2,083,059 | Fageol | June 8, 1937 |
| 2,147,906 | Lintern | Feb. 21, 1939 |
| 2,221,985 | McGinley | Nov. 19, 1940 |